United States Patent [19]
Hamasaki et al.

[11] Patent Number: 5,888,275
[45] Date of Patent: Mar. 30, 1999

[54] ASSEMBLY FOR DEAERATION OF LIQUIDS

[75] Inventors: Sadakatsu Hamasaki; Masayuki Kobayashi; Takushi Yokota, all of Okayama; Kanako Kobashi, Bizen, all of Japan

[73] Assignee: Japan Gore-Tex, Inc., Tokyo, Japan

[21] Appl. No.: 923,723

[22] Filed: Sep. 4, 1997

Related U.S. Application Data

[63] Continuation-in-part of Ser. No. 804,769, Feb. 24, 1997, Pat. No. 5,830,261.

[30] Foreign Application Priority Data

| Feb. 26, 1996 | [JP] | Japan | 8-065389 |
| Sep. 4, 1996 | [JP] | Japan | 8-253932 |
| Feb. 7, 1997 | [JP] | Japan | 9-039930 |

[51] Int. Cl.$^6$ .................................................. B01D 19/00
[52] U.S. Cl. ............................. 96/6; 96/13; 95/46
[58] Field of Search ............... 95/46; 96/4, 6, 96/7, 11–14

[56] References Cited

U.S. PATENT DOCUMENTS

| 2,597,907 | 5/1952 | Steiner et al. | 96/7 |
| 3,619,986 | 11/1971 | Mormont et al. | 96/7 |
| 3,668,837 | 6/1972 | Gross | 96/6 |
| 3,735,562 | 5/1973 | Mousseau, Jr. et al. | 96/6 |
| 3,911,080 | 10/1975 | Mehl et al. | 96/12 X |
| 4,004,587 | 1/1977 | Jess | 96/6 X |
| 4,190,426 | 2/1980 | Ruschke | 96/6 |
| 4,274,848 | 6/1981 | LaGro | 96/6 |
| 4,957,518 | 9/1990 | Brassell | 96/4 |
| 4,957,522 | 9/1990 | Brassell | 96/4 |
| 5,019,140 | 5/1991 | Bowser et al. | 96/6 |
| 5,078,755 | 1/1992 | Tozawa et al. | 95/46 |
| 5,082,472 | 1/1992 | Mallouk et al. | 96/12 X |
| 5,098,562 | 3/1992 | Shibata et al. | 210/188 |
| 5,123,937 | 6/1992 | Shibata et al. | 55/16 |
| 5,154,832 | 10/1992 | Yamamura et al. | 210/640 |

FOREIGN PATENT DOCUMENTS

| 0 354 797 | 2/1990 | European Pat. Off. . | |
| 0 356 177 | 2/1990 | European Pat. Off. . | |
| 0 360 009 | 3/1990 | European Pat. Off. . | |
| 0 661 502 | 7/1995 | European Pat. Off. . | |
| 0 707 179 | 4/1996 | European Pat. Off. . | |
| 55-119418 | 9/1980 | Japan | 96/13 |
| 60-172306 | 9/1985 | Japan . | |
| 61-216713 | 9/1986 | Japan | 96/7 |
| 61-278328 | 12/1986 | Japan | 96/7 |
| 62-001405 | 1/1987 | Japan | 96/4 |
| 1-063007 | 9/1987 | Japan . | |
| 2222099 | 2/1990 | United Kingdom | 96/6 |

*Primary Examiner*—Robert Spitzer
*Attorney, Agent, or Firm*—Gary A. Samuels

[57] ABSTRACT

A deaeration assembly for removal of air or other gases dissolved in a liquid. The assembly includes a deaeration element having a gas-channel-forming component enclosed and sealed within an envelope which includes a nonporous fluoropolymer film. The assembly also includes a liquid-channel-forming component which can be positioned on the outside of the element, or can be enclosed with the gas-channel-forming component within the element. The assembly can be formed in spiral-wound or folded configurations for installation in a deaeration module or apparatus. The deaeration assembly is useful for removal of gases dissolved in chemically aggressive liquids, high-purity liquids, and other special liquids.

22 Claims, 4 Drawing Sheets

ASSEMBLY FOR DEAERATION OF LIQUIDS

This application is a continuation-in-part of application Ser. No. 08/804,769, filed Feb. 24, 1997, now U.S. Pat. No. 5,830,261.

FIELD OF THE INVENTION

The present invention relates to apparatus for deaeration of liquids, more particularly, to an assembly for removing a gas that is dissolved in a liquid.

BACKGROUND OF THE INVENTION

That corrosive, oxidative, reactive, and contaminating properties harmful to certain products and equipment is associated with air or other gases dissolved in liquids is well known. To reduce or minimize these harmful effects are among many reasons why it is sometimes desirable to remove air and/or other gases dissolved in a liquid.

Known apparatus for performing such deaeration or degassing operations are modules which use a porous polymeric membrane material through which the dissolved gas can permeate as the means for removing the gas from the liquid. Typically, in this type of apparatus, deaeration is accomplished by having one side of the membrane contact the liquid to be deaerated, and on the other side of the membrane provide a gas channel, usually under reduced pressure, to draw away the gas permeating through the membrane. Such systems are quite effective in deaerating water of normal purity.

However, a problem with the above-mentioned deaeration apparatus in which a porous polymeric membrane material is used is that, when the liquid to be deaerated is a solvent, a liquid fat or oil, or an aqueous liquid that contains a surfactant, the liquid tends to wet the membrane material and penetrate through the pores, thus precluding deaeration.

In an effort to solve this problem, there have been proposals for a deaeration apparatus that makes use of a nonporous membrane material, for example, one obtained by coating the surface of a porous polymeric support membrane with a silicone resin, or other polymer resin through which gases can permeate at acceptable rates. While this apparatus does indeed allow deaeration to be performed when the liquid to be deaerated is a relatively mild solvent, liquid fat or oil, or aqueous liquid that contains a surfactant, they are not successfully used when the liquid to be deaerated is of exceptionally high purity or is chemically aggressive. For example, liquids such as the deionized water required for semiconductor processing, or special liquids such as photoresist liquids or developing fluids used in the manufacture of semiconductor products. Such liquids tend to leach substances from the separation membranes which then contaminate the liquids; or the liquids may cause the membranes to degrade and fail.

An object of the present invention is to provide an assembly for use in a deaeration apparatus with which such special high purity and aggressive liquids can be deaerated.

SUMMARY OF THE INVENTION

The invention provides a deaeration assembly for use in a deaeration apparatus or module which resists attack by high purity or aggressive liquids, and which minimizes leaching of materials from the assembly which can harmfully contaminate the liquid to be deaerated.

The deaeration assembly for removal of a gas from a liquid comprises a deaeration element having a gas-channel-forming component enclosed and sealed within an envelope formed of a nonporous fluoropolymer film, or formed of a nonporous fluoropolymer film laminated to a porous support film. In either case, the outward-facing surface of the envelope is a nonporous fluoropolymer surface. In use, liquid to be deaerated is passed over an outward-facing surface of the element at a pressure higher than the pressure inside the element. The gas channels formed by the gas-channel-forming component provide pathways through the inside of the envelope for gases which have permeated from the liquid into the envelope, to a port in the film envelope which is connected to means for transfer of gases to a location external to the apparatus. The assembly further comprises a liquid-channel-forming component, contiguous with at least one outward-facing surface of the fluoropolymer envelope, which provides pathways for liquid to pass over and to contact the outward-facing surface of the element. When the element is formed into a spiral or folded structure, the liquid-channel-forming component also serves as a spacer between adjacent layers of the element.

In another embodiment of the invention the gas-channel-forming component and liquid-channel-forming component are both enclosed within the nonporous fluoropolymer envelope. In this embodiment the liquid-channel-forming component is contiguous with at least one inward-facing surface of the fluoropolymer envelope. The portions of the fluoropolymer envelope contiguous with the liquid-channel-forming component conform to the liquid-channel-forming contours of the channel-forming component and thereby form liquid channels in the outward-facing surface of that portion of the element.

DETAILED DESCRIPTION OF THE INVENTION

With reference to the figures, the invention will be described in detail. To facilitate understanding, the same numerical identifiers for elements common to the figures will be used throughout the figures.

The term "unonporous" is used herein simply to describe a material which is essentially free of pores or voids, and which is a barrier to bulk flow of liquids or gases.

While a material may be nonporous, it may still be "permeable" to liquids or gases. The term "permeable", (and correspondingly "impermeable"), or a variation thereof, is used herein to describe the property of a material to transport (or not transport) a particular species, such as gas or water-vapor, through the material. The term describes the overall property of mass transfer by diffusion at a molecular level, and in no way implies any particular scientific mechanism by which this occurs.

Figure 1:
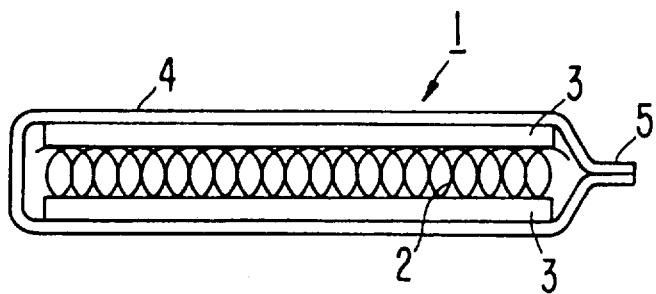
FIG. 1 is a cross-sectional view of the element containing a gas-channel-forming component enclosed by an envelope having an unreinforced edge seal.

In FIG. 1 is shown a cross-section of a deaeration element 1 which includes a nonporous fluoropolymer envelope 4. The envelope 4 can be made of a single sheet of nonporous fluoropolymer film, or made of a nonporous fluoropolymer film laminated to a porous support film. The envelope encloses a porous gas-channel-forming material 2 on each side of which is laminated a porous polymeric membrane 3. The overlapping edges of the fluoropolymer film envelope 4 are sealed at an edge region 5 which extends along the length and across the ends of the deaeration element 1.

Nonporous fluoropolymer films are used in making the envelope 4 of the deaeration element 1 due to their well known chemical inertness, i.e., they are highly resistant to attack by aggressive chemicals, solvents, oils, and high purity water or other aqueous liquids, and thereby minimize contamination of liquids in contact with them. Many fluoropolymers can be used so long as nonporous films made of them have sufficient chemical resistance to the liquids to which they will be exposed and are sufficiently permeable by the gases dissolved or entrained in the liquids. Preferably, the fluoropolymers are melt-processible thermoplastic fluoropolymers such as tetrafluoroethylene-hexafluoropropylene copolymer (FEP), tetrafluoroethylene-(perfluoroalkyl) vinyl ether copolymer (PFA), amorphous fluoropolymers, such as TEFLON AF® amorphous fluoropolymer, and the like. Such fluoropolymers are well know in the art and are readily available in sheet and film form from a number of suppliers.

The thickness of the nonporous fluoropolymer film influences properties such as gas permeation rate, strength, processability, durability in use, etc., and may necessitate some compromise or trade-offs between desired properties. The nonporous fluoropolymer film used in making the envelope 4 should be in the range 1 to 100 micrometers thick, preferably in the range 10 to 40 micrometers thick if unsupported; or in the range 0.7 to 20 micrometers, preferably in the range 1 to 5 micrometers if supported. When unsupported, if the nonporous fluoropolymer film is less than about 5 micrometers thick, it will be difficult to handle and will lack pressure resistance and durability in use. When supported, for example, by lamination to a porous polytetrafluoroethylene film, the nonporous fluoropolymer can be as thin as 1 micrometer or less. On the other hand, if the film is thicker than about 100 micrometers, gas permeation rates through the film may be too low to be useful.

Envelope 4 can also be made of a composite sheet comprising a nonporous fluoropolymer film laminated to a porous support film or fabric. The porous support must have excellent mechanical strength, flexibility, pliancy, and surface smoothness. Suitable materials for the support include woven, knit, or nonwoven fabrics, or films, open-cell foams, mesh, and the like, of polyethylene, polypropylene, polyester, polyurethane, fluoropolymers, and the like. Preferably the porous support material is a fluoropolymer, most preferably porous polytetrafluoroethylene sheet or film. The support material should be in the range 1 to 100 micrometers thick, preferably in the range about 20 to 40 micrometers thick. Support material thinner than 1 micrometer thick is too weak, and material thicker than about 100 micrometers are too bulky, unnecessarily increasing the size of the element.

Porous polytetrafluoroethylene sheet or film suitable for use in the invention can be made by processes known in the art, for example, by stretching or drawing processes, by papermaking processes, by processes in which filler materials are incorporated with the PTFE resin and which are subsequently removed to leave a porous structure, or by powder sintering processes. Preferably the porous polytetrafluoroethylene film is a porous expanded polytetrafluoroethylene film having a structure of interconnected nodes and fibrils, as described in U.S. Pat. Nos. 3,953,566 and 4,187,390 which describe the preferred material and processes for making them.

The porous polytetrafluoroethylene membrane should have a pore volume in the range of about 30 to 95 percent, a nominal pore size in the range of about 0.1 to 100 micrometers, and be about 5 to about 100 micrometers thick. Lamination of the nonporous fluoropolymer film to the porous polytetrafluoroethylene support film can be done using conventional methods and equipment, for example, by adhesive bonding. The adhesive can be applied to the surface to be bonded of either layer, and should be applied in a noncontinuous pattern. A noncontinuous pattern of adhesive is used herein to indicate a layer of adhesive which is applied to a surface so as to not form a nonporous continuous film. For example, a layer applied to a surface as a pattern of discrete dots, a porous non-woven web or mesh, or the like.

Lamination of the nonporous fluoropolymer film to a porous polytetrafluoroethylene support is preferably done using conventional heat fusion methods and equipment whereby the nonporous fluoropolymer film is adhered to the support membrane, for example, by application of heat and pressure by heated platens, or by passage through the nip of heated calender rolls. The temperature of the platens or rolls should be in the range between the softening point to slightly above the melt temperature of the melt-processible fluoropolymer, for example, for films of tetrafluoroethylene-hexafluoropropylene copolymer (FEP) and tetrafluoroethylene-(perfluoroalkyl) vinyl ether copolymer (PFA), the temperatures should be in the range about 240° C. to 315° C. Good bonding of the melt-processible fluoropolymer to the support membrane is obtained by slight penetration of the melt-processible fluoropolymer into the surface regions of the porous polytetrafluoroethylene film to form interlocking mechanical bonds in the porous structure. The composite fluoropolymer film thus made can be used as laminated or can be further stretched to form a thinner film having a higher gas permeation rate.

If a thinner film is desired, the composite material formed of the nonporous fluoropolymer film and support membrane can be heated to a temperature near or slightly above the melt point of the melt-processible fluoropolymer and stretched uniaxially or biaxially in the planar directions. Stretching may be done using conventional equipment or apparatus known in the art. For example, stretching equipment such as differential speed rolls for stretching in the machine direction (MD) and tenter frames for stretching in the transverse direction (TD) can be used. Stretching in two directions may be done simultaneously or sequentially, and may be done in one or more steps. The amount of stretch, relative to original dimensions in the planar x-y directions is ordinarily in the range 1.5 to 15:1. As the composite fluoropolymer film is stretched in the planar x-y directions the area of its surface progressively increases and its thickness is progressively reduced. At the same time, as there is no change in the volume of melt-processible fluoropolymer, the nonporous fluoropolymer film becomes progressively thinner as the material of the film is dragged and spread by the stretching membrane.

Such composite stretched films are preferably formed by laminating a nonporous melt-processible fluoropolymer film, such as a FEP or PFA film 10 to 100 micrometers thick, to a porous polytetrafluoroethylene film 20 to 200 micrometers thick. The composite film is then stretched in one or two directions an amount of about 1.5–15 to 1 at a temperature in the range about 240° C. to 315° C. After stretching, the thickness of the nonporous film is in the range about 0.7 to 50 micrometers thick, preferably in the range about 1 to 20 micrometers thick. The thickness of the porous polytetrafluoroethylene film is reduced to about 1.3 to 100 micrometers thick, preferably in the range 5 to 50 micrometers thick. The stretched composite film thickness is in the range 2 to 150 micrometers, preferably in the range about 6 to 70 micrometers.

There are no particular limitations on the length and width dimensions of the envelope 4 except as dictated by deaeration performance desired and availability of materials. Typically, the envelope 4 should be in the range 10 to 100 centimeters wide and in the range 2 to 20 meters long. As the element 1 is typically operated at a pressure differential between the outside and inside of the element, the inside being at a lower pressure, there are some practical limitations imposed due to pressure drop across the element walls or through the interior of the element. If the envelope is too long, it will be difficult to maintain the desired pressure differential across the walls of the element over its full length. On the other hand, if the envelope is too short there may not be sufficient surface area available to achieve the desired gas permeation rate. Nevertheless, even with these considerations, there is considerable flexibility in choosing suitable length and width dimensions for the envelope 4.

The nonporous fluoropolymer film envelope 4 can be made from a single sheet as shown in FIG. 1, or can be made using two sheets of nonporous fluoropolymer film or laminate, in which case the seal region 5 extends around the entire periphery of the element. Alternatively, unsupported nonporous thin-walled tubes of a melt-processible thermoplastic fluoropolymer can be extruded or blow-molded and flattened to form the envelope 4. In this case, only the ends will have a seal region 5. Sealing the open edges of an envelope 4 made of a melt-processible thermoplastic fluoropolymer film or laminate can be readily accomplished by application of heat and pressure at seal regions 5 where the film overlaps the porous gas-channel-forming component 2. Many heat sealing methods are known in the art and can be used.

Figure 2:
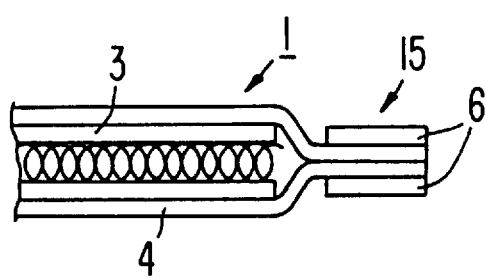
FIG. 2 is a partial cross-sectional view of the element with an envelope having a reinforced edge seal.

An alternative seal region 15 is illustrated in FIG. 2. In this configuration reinforcing strips 6 of porous polytetrafluoroethylene (PTFE) film are placed on the outward-facing surfaces of the envelope 4 at the seal region 15 prior to heat sealing. When heat sealing is performed some of the melt-processible fluoropolymer film penetrates into the porous PTFE film and the strength and reliability of the seal are enhanced. The porous PTFE film also serves as an excellent release material which prevents contact between melted thermoplastic fluoropolymer and equipment surfaces applying heat and pressure to the seal region 15. Preferably, the porous PTFE film is porous expanded polytetrafluoroethylene film.

The interior of the deaeration element 1 contains a gas-channel-forming component 2 which provides pathways through the inside of the element for gases which have permeated from the liquid through the film forming the envelope 4, to at least one port in the film envelope 4 which is connected to means for transfer of gases to a location external to the apparatus. The gas-channel-forming component must be able to withstand the compressive forces exerted on it, be compatible with the gases to be removed from the liquid, and, within these limitations, have a structure as open or porous as possible so as to minimize the pressure drop through the interior of the element 1. Preferably the gas-channel-forming component 2 is made of a synthetic polymer, although other materials can also be used. Suitable polymeric material and forms are known in the art and are available commercially. Suitable materials include polymers such as polyolefins, polyesters, nylons, polyurethanes, polycarbonates, polystyrenes, polyvinyl chloride, polyvinylidene chloride, and the like; or fluoropolymers such as PTFE, FEP, PFA, polyvinylfluoride, polyvinylidene fluoride, and the like. Suitable forms include nonwoven fabric, knit fabric, woven fabric or mesh, open-cell foams, porous membranes, and the like. The thickness of the gas-channel-forming component 2 is preferably in the range of about 0.3 millimeters to about 2 millimeters, and should have length and width dimensions somewhat less, about 2 millimeters to about 10 millimeters less, than the length and width dimensions of the envelope 4 in order to provide sufficient area to form the seal region 5.

Figure 3:
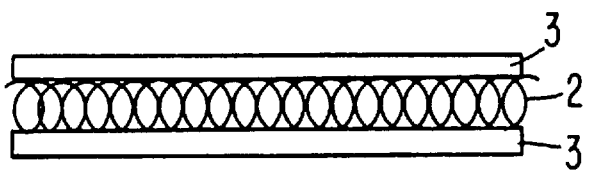
FIG. 3 is a cross-sectional view of a gas-channel-forming component.
Figure 4:
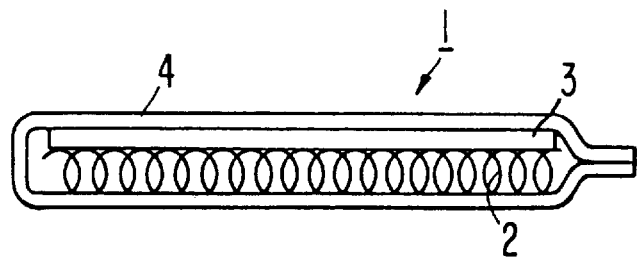
FIG. 4 is a cross-sectional view of a deaeration element containing a gas-channel-forming component.

When an unsupported nonporous fluoropolymer film is used to form envelope 4, it can be desirable to laminate a porous membrane 3 to both sides of the gas-channel-forming component 2, to form a subassembly as shown in FIG. 3; or to one side of the gas-channel-forming component 2, as shown in FIG. 4, where the subassembly is shown positioned in the fluoropolymer envelope 4 of the element 1. The porous membrane 3 provides support to the nonporous fluoropolymer film forming the envelope 4 and helps to more uniformly distribute the compressive load on the gas-channel-forming component 2 encountered during operation. By providing such support to the fluoropolymer film, a thinner film can be used to form the envelope 4, thereby increasing the gas permeation rate from the liquid outside the element to the gas channels inside the element. Preferably the porous membrane 3 is also made of a synthetic polymer and its selection is subject to the same constraints listed above for the gas-channel-forming component. Most preferred are porous membranes of polytetrafluoroethylene such as described hereinabove.

Lamination of the porous membrane 3 to the gas-channel-forming component 2 can be done using conventional methods and equipment, for example, by adhesive bonding. The adhesive can be applied to the surface to be bonded of either layer, and should be applied in a non-continuous pattern. For example, a layer applied to a surface as a pattern of discrete dots, a porous non-woven web or mesh, or the like.

The adhesive may be selected from many known in the art. The adhesive can be a thermoplastic, thermosetting, or reaction curing type, in liquid or solid form, selected from the classes including, but not limited to, polyamides, polyacrylamides, polyesters, polyolefins, polyurethanes, and the like. The adhesive should be applied so that it forms a porous (non-continuous) gas-permeable layer which minimizes resistance to air flow while adhering the porous membrane 3 to the gas-channel-forming component 2. Preferably, the adhesive is applied so as to cover about 30 percent or less of the surface. Suitable application means include gravure printing, spray coating, powder coating, interposing a non-woven web of adhesive, and the like.

Lamination of the porous membrane 3 to the gas-channel-forming component 2 can be also be done using conventional heat-fusing methods and equipment, for example, by application of heat and pressure in the nip between rolls, or by a heated platen press, as described earlier.

One or more ports, or openings, are provided in the element 1 for passage of gases out of the element. Transfer means, preferably a tube of the same melt-processible thermoplastic fluoropolymer used to form the envelope 4, for removal of gases from inside the element to a location external to the module or apparatus in which the element 1 is positioned is connected to the port by any convenient method. The outside diameter of the tube should be about 4 millimeters to about 10 millimeters, and the wall thickness about 0.5 millimeters to about 1 millimeter. By way of example only, one such connection is illustrated in FIG. 5.

Figure 5:
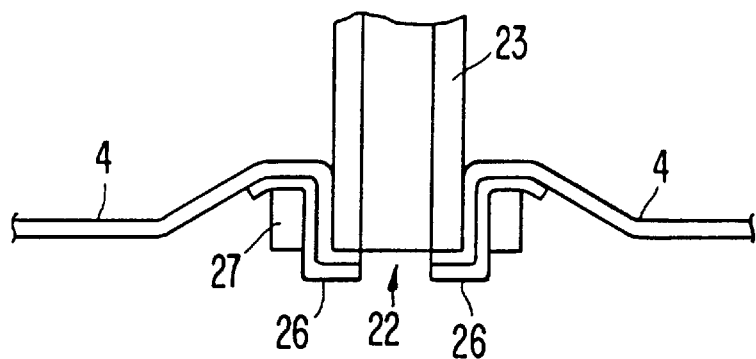
FIG. 5 is a cross-sectional view of an example of a connection between a gas removal tube and the envelope at a port in the envelope.

In FIG. 5 is shown a section of one wall of the melt-processible thermoplastic fluoropolymer film envelope 4 in which an opening 22 leading to the inside of the element has been made. An end of a tube 23, preferably of the same fluoropolymer used in the envelope, is positioned around the opening 22. A fluoropolymer ring 27 and porous PTFE film 26 are pressed into place around the end of the tube 23 so that, when finally positioned, the film forming the envelope 4 and the PTFE film 26 overlap the end of the tube 23, and the edge of the ring 27 is approximately even with the end of the tube 23. The portion of the envelope 4 overlapping the end of the tube 23 is heat sealed to the end of the tube by application of a heated plate (not shown) to the PTFE film portion overlapping the end of the tube, and a strong air-tight seal is formed. The fluoropolymer ring 27 serves as a strain relief for the connection and also prevents distortion or contraction of the envelope film during the heat sealing step. The porous PTFE film 26 serves to reinforce the seal region and serves as a release material to prevent melted fluoropolymer from sticking to the heated plate.

Figure 6:
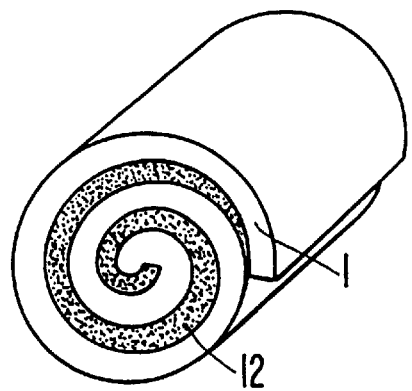
FIG. 6 shows a spirally-wound element with a liquid-channel-forming component interposed between adjacent outer surfaces of the element.
Figure 7:
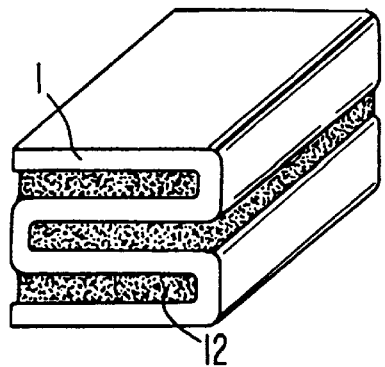
FIG. 7 shows a folded element with a liquid-channel-forming component interposed between adjacent outer surfaces of the element.

To most efficiently use the element, it may be positioned in a module or apparatus in a spiral-wound configuration, as shown in FIG. 6; or in a folded configuration, as shown in FIG. 7. In such configurations a space between adjacent element layers must be provided to permit the liquid to be deaerated to contact the outer surface of the element and to permit the liquid to flow through the module. This space can be provided by interposing a liquid-channel-forming component 12 between adjacent layers of the element 1, as shown in FIGS. 6 and 7. The void size and distance between element layers provided by the liquid-channel-forming component 12 should be in the range 50 to 1000 micrometers, preferably in the range 100 to 400 micrometers. If the spacing is larger than 1000 micrometers, deaeration performance will suffer as the diffusion distance for the gas through the liquid will become too great. If the spacing is less than 50 micrometers, the pressure drop of the liquid through the liquid-channel-forming component may become too high. The length of the liquid-channel-forming component should be roughly the same as the length of the deaeration element. The width of the liquid-channel-forming component should be at least as wide as the deaeration element, and may be somewhat wider (about 1–2 centimeters) so as to extend beyond and protect the longitudinal edges of the fluoropolymer film envelope.

As with the gas-channel-forming component described earlier, suitable materials include polymers such as polyolefins, polyesters, nylons, polyurethanes, polycarbonates, polystyrenes, polyvinyl chloride, polyvinylidene chloride, and the like; or fluoropolymers such as PTFE, FEP, PFA, polyvinylfluoride, polyvinylidene fluoride, and the like; in forms such as nonwoven fabric, knit fabric, woven fabric or mesh, and the like. In systems in which chemically aggressive and high purity liquids, or special liquids in which contamination must be minimized, it is preferred that the liquid-channel-forming component be made of a fluoropolymer such as PTFE, PFA, or FEP.

Figure 8:
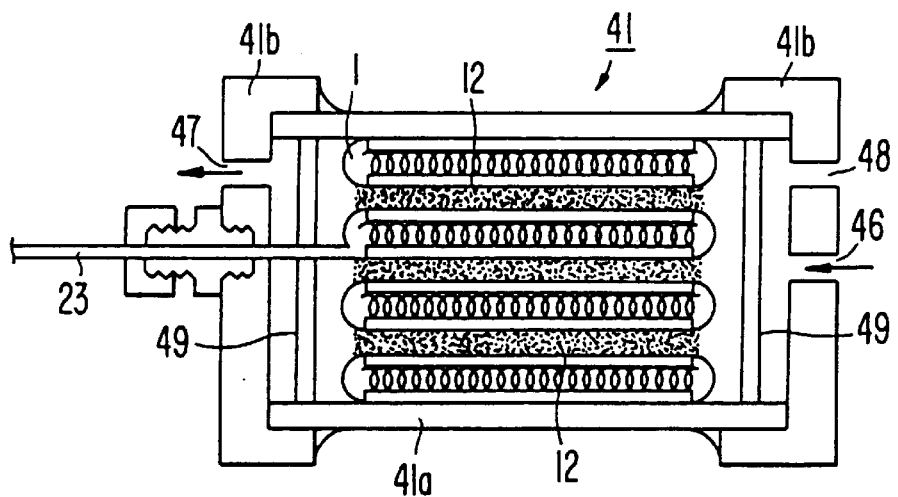
FIG. 8 is a cross-sectional view of a module containing an embodiment of the assembly of the invention.

A cross-sectional view of a deaeration apparatus or module containing a spiral-wound assembly of the invention is shown in FIG. 8. The module 41 has a cylindrical casing body 41a, and end caps 41b at each end. A spirally-wound element 1, with a liquid-channel-forming component 12 interposed between adjacent layers of the element, is disposed in the casing body. A gas removal tube 23 is connected to the element 1 and exits the module through a fitting in an end cap 41b. An inlet opening 46 for a liquid to be deaerated, and a vent opening 48 for removal of air during initial filling of the module with the liquid, are provided in one end cap. In the opposing end cap is an outlet opening 47 for liquid which has been deaerated. Optionally, porous material 49 can be disposed between the element and end caps. The module shown is a conventional type, well known in the art, as are the materials and construction methods to make it, which are selected according to the fluids and operating conditions which will be encountered in the projected end-use. Again, in systems in which chemically aggressive and high purity liquids, or special liquids in which contamination must be minimized, it is preferred that the module be made of a fluoropolymer such as PTFE, PFA, or FEP, or the liquid-wetted surfaces be lined with a fluoropolymer.

After the module is initially filled with a liquid to be deaerated, and trapped air exhausted through the vent opening 48, liquid flow through the liquid-channel-forming component is begun and the interior of the element 1 is operated at a pressure lower than the pressure of the liquid flowing over the outer surface of the element, for example, by drawing a vacuum through the gas removal tube 23. Gas dissolved in the liquid, driven by the pressure differential between the liquid and the interior of the element, diffuses out of the liquid and permeates through the fluoropolymer film forming the envelope of the element, passes through the gas channels formed inside the element to the gas removal tube, and thence out of the module. At the same time, the dissolved gas concentration in the liquid becomes progressively lower as the liquid flows over and past the surface of the deaeration element.

The deaeration assembly of the invention accomplishes the efficient removal of gases dissolved not only in ordinary liquids such as water or aqueous solutions, but also in chemically aggressive, high purity, and other special liquids, while contributing virtually no contaminants to the liquids.

Figure 9:
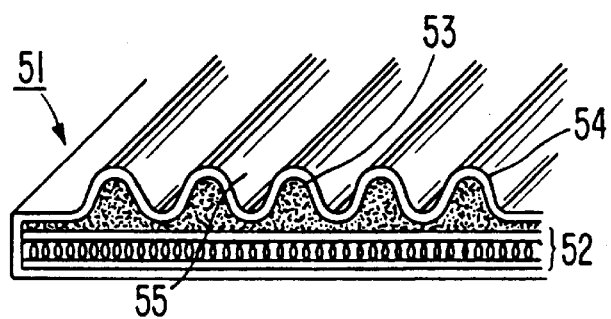
FIG. 9 is a partial cross-sectional and perspective view of a deaeration element in which both the gas-channel-forming component and liquid-channel-forming component are contained within the envelope.
Figure 10:
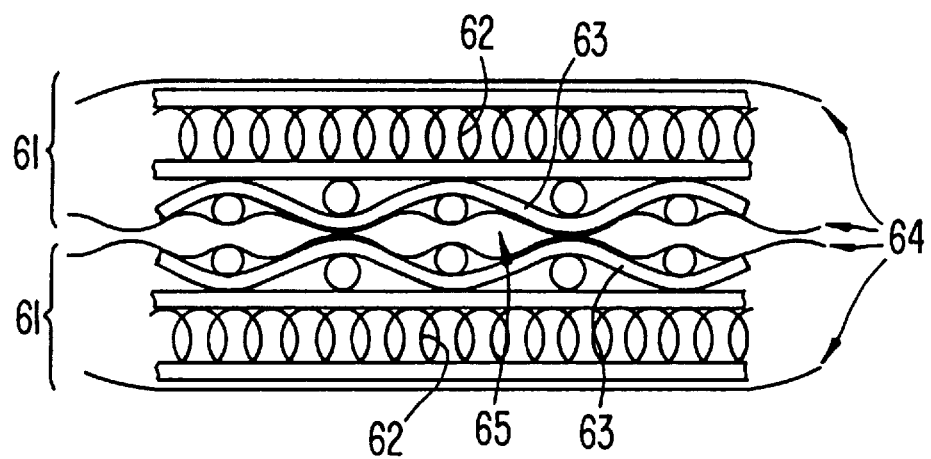
FIG. 10 is a partial cross-sectional view of adjacent element layers of another deaeration element in which both the gas-channel-forming component and liquid-channel-forming component are contained within the envelope.

Referring to FIGS. 9 and 10, another embodiment of the deaeration assembly of the invention is shown. The second embodiment differs from the embodiment described hereinabove in that: [i] both the liquid-channel-forming component and gas-channel-forming component are enclosed within the fluoropolymer film envelope of the element, [ii] the liquid-channel-forming component is contiguous with at least one inward-facing surface of the fluoropolymer film, [iii] in use, the fluoropolymer film is drawn inward and conforms to the contours of the liquid-channel-forming component thereby creating channels along the outward-facing surface of the fluoropolymer film, and [iv] the liquid-channel-forming component does not come in contact with the liquid to be deaerated. In other respects, the second embodiment is the same as the embodiment described earlier.

FIG. 9 shows an element 51 consisting of a gas-channel-forming subassembly 52 of a porous membrane laminated to each side of a gas-channel-forming component (as depicted in FIG. 3), and a liquid-channel-forming component 53 of a porous ribbed material, each component contiguous with an inward-facing surface of an envelope 54 of a nonporous fluoropolymer film. The ribbed material of the liquid-channel-forming component can be, for example, a knitted ribbed fabric of synthetic polymer fibers. In operation, the pressure differential between the outside and the inside of the element causes the inward-facing surface of the fluoropolymer film contiguous with the liquid-channel-forming component to contact and generally conform to the contours of the liquid-channel-forming component 53 to form channels 55, defined by the ribs of the material, for passage of liquids over the outward-facing surface of the element 51.

FIG. 10 shows sections of adjacent element layers 61 of another deaeration element in which both the gas-channel-forming subassembly 62 and liquid-channel-forming component 63 of a woven material are contained within the fluoropolymer film envelope 64. The woven material of the liquid-channel-forming component can be, for example, a woven fabric or mesh of synthetic polymer fibers. As noted above, in operation, the pressure differential between the outside and the inside of the element causes the inward-facing surface of the fluoropolymer film contiguous with the liquid-channel-forming component to generally conform to the high spots and depressions of the woven material to form corresponding high spots and depressions in the outward-facing surface to form channels 65 for passage of liquids over the outward-facing surface of the element 61.

In this embodiment of the assembly of the invention a liquid-channel-forming component external to the element is not needed which significantly reduces the risk of contamination of the liquids, reduces material costs, and simplifies manufacture of the assembly.

EXAMPLE 1

On each side of a 250 micrometers thick polyester knitted fabric (Stock No. 2020, 20-denier staple fiber; made by Toray Co) was laminated a 30 micrometers thick porous expanded PTFE membrane (made by Japan GoreTex, Inc.) having a pore volume of 82%. The laminate thus produced was cut to make a gas removal subassembly 20 centimeters wide and 9 meters long of the type shown in FIG. 3.

The subassembly was placed on a 12.5 micrometers thick FEP film (made by Daikin Industries) which was then folded over the subassembly, and the open ends and longitudinal edge heat-sealed to form an element about 20 cm wide and 9.3 m long of the type shown in FIG. 1. An FEP tube, 6 mm outside diameter and 4 mm inside diameter, was connected to one end of the element to serve as a gas removal tube. The tube was connected and heat-sealed to the element by the method shown in FIG. 5.

A woven mesh of PFA (made by Gunze Co.), about 8 mesh/cm (20 mesh/inch) and 0.51 mm thick, was cut to a width of 24 cm and a length of 9.3 m to serve as a liquid-channel-forming component. The liquid-channel-forming component was placed on and aligned over the element, and the element, with the liquid-channel-forming component interposed between layers, was rolled up (as shown in FIG. 6) to form a spiral-wound deaeration assembly of 101.6 mm diameter and 24 cm length which provided 3.72 $m^2$ of surface area for liquid contact. The deaeration assembly thus made was installed in a module of the type shown in FIG. 8 which had a casing body and end caps made of PTFE.

The deaeration assembly was tested by flowing tap-water having an initial dissolved oxygen concentration of 8.2 ppm through the module at a rate of 300 cc/minute at 25° C. The pressure inside the element was reduced and kept at about 100 Torr by a vacuum pump.

The dissolved oxygen concentration of the deaerated liquid at the outlet of the module was measured and found to be 2.9 ppm, which is a good value.

A second test under the same conditions except that tap-water containing 9% neutral detergent (with surfactant) was used. The dissolved oxygen content of the deaerated liquid at the outlet was found to be 2.95 ppm, which is also a good value.

After the second test, the module was emptied of water and filled with 98% ethyl alcohol. The pressure inside the element was reduced to 100 Torr. No alcohol was detected in the gas sampled from the gas removal tube, confirming that the alcohol liquid did not permeate through the FEP deaeration film.

Hot water (90° C.) was also passed through the module, after which the apparatus was disassembled and the various components inspected. No change whatsoever was seen in any of the materials.

It is apparent from the above that the deaeration assembly of the invention permits deaeration of a liquid containing a surfactant, and that there is no problem with washing the assembly with 90° C. hot water. Furthermore since the deaeration apparatus used in this example makes use of FEP, PFA, or PTFE for all its liquid-wetted parts, it can also be used with chemically aggressive liquids which are strongly acidic or alkaline.

EXAMPLE 2

A deaeration assembly was made as described in Example 1, except that the FEP film was 25 micrometers thick.

The deaeration assembly was installed in the module and the same tests performed as described in Example 1, except that the liquid flow rate was 200 cc/minute.

The dissolved oxygen content of the deaerated liquid at the module outlet was found to be 2.95 ppm, which is a good value. The results of the other tests were the same as described in Example 1.

EXAMPLE 3

A gas removal subassembly was made as described in Example 1.

The subassembly was placed on a 25 micrometers thick FEP film (made by Daikin Industries). A woven mesh of PFA (made by Gunze Co.), about 8 mesh/cm (20 mesh/inch) and 0.51 mm thick to serve as the liquid-channel-forming component, was cut to the same width and length as the subassembly. The liquid-channel-forming component was placed on and aligned over the gas removal subassembly. The FEP film was then folded over the subassembly and liquid-channel-forming component, and the open ends and longitudinal edge heat-sealed to form an element about 20 cm wide and 9.3 m long of the type shown in FIG. 9. An FEP tube, 6 mm outside diameter and 4 mm inside diameter, was connected to one end of the element to serve as a gas removal tube. The tube was connected and heat-sealed to the element by the method shown in FIG. 5.

The element, with the liquid-channel-forming component and gas removal subassembly enclosed within the FEP film envelope, was rolled up to form a spiral-wound deaeration assembly which provided about 3.72 m² of surface area for liquid contact. The deaeration assembly thus made was installed in a module and tested as described in Example 1.

The dissolved oxygen content of the deaerated liquid at the module outlet was found to be 2.7 ppm, which is a good value. The results of the other tests were the same a s described in Example 1.

EXAMPLE 4

A deaeration assembly having the same structure and dimensions as described in Example 1 was made, the only difference being that the FEP film was 25 micrometers thick and was extruded in tubular form. A jig was prepared and the gas removal subassembly was drawn into the tube, thus only the ends of the tube required sealing. This procedure greatly simplified and shortened the production process to form the deaeration assembly. The deaeration assembly thus made was installed in a module and tested as described in Example 1.

The dissolved oxygen content of the deaerated liquid at the module outlet was found to be 2.95 ppm, which is a good value. The results of the other tests were the same as described in Example 1.

EXAMPLE 5

A deaeration assembly having the same structure and dimensions as described in Example 3 was made, the only difference being that the FEP film was extruded in tubular form. A jig was used to simultaneously draw the gas removal subassembly and liquid-channel-forming component into the tube, thus only the ends of the tube required sealing. This procedure greatly simplified and shortened the production process to form the deaeration assembly. The deaeration assembly thus made was installed in a module and tested as described in Example 1.

The dissolved oxygen content of the deaerated liquid at the module outlet was found to be 3.02, which is a good value. The results of the other tests were the same as described in Example 1.

EXAMPLE 6

On each side of a 250 micrometers thick polyester knitted fabric (Stock No. 2020, 20-denier staple fiber; made by Toray Co) was laminated a 30 micrometers thick porous expanded PTFE membrane (made by Japan Gore-Tex, Inc.) having a pore volume of 82%. The laminate thus produced was cut to make a gas removal subassembly 20 centimeters wide and 9 meters long of the type shown in FIG. 3.

The subassembly was placed on a 12.5 micrometers thick PFA film (made by Daikin Industries) which was then folded over the subassembly, and the open ends and longitudinal edge heat-sealed to form an element about 20 cm wide and 9.3 m long of the type shown in FIG. 1. A PFA tube, 6 mm outside diameter and 4 mm inside diameter, was connected to one end of the element to serve as a gas removal tube. The tube was connected and heat-sealed to the element by the method shown in FIG. 5.

A woven mesh of PFA (made by Gunze Co.), about 8 mesh/cm (20 mesh/inch) and 0.51 mm thick, was cut to a width of 24 cm and a length of 9.3 m to serve as a liquid-channel-forming component. The liquid-channel-forming component was placed on and aligned over the element, and the element, with the liquid-channel-forming component interposed between layers, was rolled up (as shown in FIG. 6) to form a spiral-wound deaeration assembly of 101.6 mm diameter and 24 cm length which provided 3.72 m² of surface area for liquid contact. The deaeration assembly thus made was installed in a module of the type shown in FIG. 8 which had a casing body and end caps made of PTFE.

The deaeration assembly was tested by flowing tap-water having an initial dissolved oxygen concentration of 8.2 ppm through the module at a rate of 300 cc/minute at 25° C. The pressure inside the element was reduced and kept at about 100 Torr by a vacuum pump.

The dissolved oxygen concentration of the deaerated liquid at the outlet of the module was measured and found to be 3.1 ppm, which is a good value.

A second test under the same conditions except that tap-water containing 9% neutral detergent (with surfactant) was used. The dissolved oxygen content of the deaerated liquid at the outlet was found to be 3.14 ppm, which is also a good value.

After the second test, the module was emptied of water and filled with 98% ethyl alcohol. The pressure inside the element was reduced to 100 Torr. No alcohol was detected in the gas sampled from the gas removal tube, confirming that the alcohol liquid did not permeate through the FEP deaeration film.

Hot water (90° C.) was also passed through the module, after which the apparatus was disassembled and the various components inspected. No change whatsoever was seen in any of the materials.

It is apparent from the above that the deaeration assembly of the invention permits deaeration of a liquid containing a surfactant, and that there is no problem with washing the assembly with 90° C. hot water. Furthermore since the deaeration apparatus used in this example makes use of FEP, PFA, or PTFE for all its liquid-wetted parts, it can also be used with chemically aggressive liquids which are strongly acidic or alkaline.

EXAMPLE 7

A deaeration assembly was made as described in Example 6, except that the FEP film was 25 micrometers thick.

The deaeration assembly was installed in the module and the same tests performed as described in Example 6, except that the liquid flow rate was 200 cc/minute.

The dissolved oxygen content of the deaerated liquid at the module outlet was found to be 2.6 ppm, which is a good value. The results of the other tests were the same as described in Example 1.

EXAMPLE 8

A gas removal subassembly was made as described in Example 6.

The subassembly was placed on a 12.5 micrometers thick FEP film (made by Daikin Industries). A woven mesh of PFA (made by Gunze Co.), about 8 mesh/cm (20 mesh/inch) and 0.51 mm thick to serve as the liquid-channel-forming component, was cut to the same width and length as the subassembly. The liquid-channel-forming component was placed on and aligned over the gas removal subassembly. The PFA film was then folded over the subassembly and liquid-channel-forming component, and the open ends and longitudinal edge heat-sealed to form an element about 20 cm wide and 9.3 m long of the type shown in FIG. 9. A PFA tube, 6 mm outside diameter and 4 mm inside diameter, was connected to one end of the element to serve as a gas removal tube. The tube was connected and heat-sealed to the element by the method shown in FIG. 5.

The element, with the liquid-channel-forming component and gas removal subassembly enclosed within the PFA film envelope, was rolled up to form a spiral-wound deaeration assembly which provided about 3.72 $m^2$ of surface area for liquid contact. The deaeration assembly thus made was installed in a module and tested as described in Example 1.

The dissolved oxygen content of the deaerated liquid at the module outlet was found to be 2.8 ppm, which is a good value. The results of the other tests were the same as described in Example 1.

EXAMPLE 9

A deaeration assembly having the same structure and dimensions as described in Example 6 was made, the only difference being that the PFA film was 25 micrometers thick and was extruded in tubular form. A jig was prepared and the gas removal subassembly was drawn into the tube, thus only the ends of the tube required sealing. This procedure greatly simplified and shortened the production process to form the deaeration assembly. A degassing tube was installed and the deaeration assembly thus made was installed in a module and tested as described in Example 1.

The dissolved oxygen content of the deaerated liquid at the module outlet was found to be 3.1 and 3.15, which are good values. The results of the other tests were the same as described in Example 1.

EXAMPLE 10

The surface of a 25 micrometers thick FEP film (made by Daikin Industries) was washed with ethyl alcohol and dried at room temperature. The washed surface of the film was treated with TETRA-ETCH® (an etchant for fluoropolymer surfaces, made by Junkosha Corp.), then washed again with ethyl alcohol and dried. The washed film was laminated to a 250 micrometers thick polyester knit fabric (Stock No. 2020, 20 denier staple fiber, made by Toray Co.) using an epoxy resin-based adhesive (Product. No. 3446, made by Mereko Co.) applied in a dot pattern by a gravure printing roll. The laminated composite film was heated in an oven at 80° C. for 2 hours.

Two sheets of the laminated composite, 19 cm wide and 8.5 m long, were superposed with the FEP film on the outside and the four edges heat sealed to form an envelope-type element. An FEP tube, 6 mm OD and 4 mm ID, was connected near one end of the element to serve as a gas-removal tube. The tube was connected and heat-sealed to the element by the method shown in FIG. 5.

A woven mesh of PFA (made by Gunze Co.), about 8 mesh/cm (20 mesh/inch) and 0.51 mm thick, was cut to a width of 23 cm and a length of 8.5 m to serve as a liquid-channel-forming component. The liquid-channel-forming component was placed on and aligned over the element, and the element, with the liquid-channel-forming component interposed between layers, was rolled up (as shown in FIG. 6) to form a spiral-wound deaeration assembly which provided 3.2 $m^2$ of surface area for liquid contact. The deaeration assembly thus made was installed in a module of the type shown in FIG. 8 which had a casing body and end caps made of PTFE. The liquid contact distance was 19 cm, and the gaps between the liquid channels were 0.5 mm.

The deaeration assembly was tested by flowing tap-water having an initial dissolved oxygen concentration of 8.5 ppm through the module at a rate of 200 cc/minute at 22° C. The pressure inside the element was reduced and kept at about 60 Torr by a vacuum pump. The differential pressure between the water inlet and outlet of the module was 0.1 $kg/cm^2$.

When the module was first operated at water pressure of 2 $kg/cm^2$ the dissolved oxygen concentration of the deaerated liquid at the outlet of the module was measured and found to be 3.04 ppm, which is a good value. When the water pressure was raised to 4 $kg/cm^2$ the dissolved oxygen content at the outlet was 3.08 $kg/cm^2$, and when the water pressure was returned to 2 $kg/cm^2$ the dissolved oxygen concentration was 3.08 ppm, verifying that the envelope film had good strength.

A second test under the same conditions except that tap-water containing 5% neutral detergent (with surfactant) was used. The dissolved oxygen content of the deaerated liquid at the outlet was found to be 3.1 ppm, which is a good value.

After the second test, the module was emptied of water and filled with 98% ethyl alcohol. The pressure inside the element was reduced to 30 Torr. No alcohol was detected in the gas sampled from the gas removal tube, confirming that the alcohol liquid did not permeate through the FEP deaeration film.

Hot water (90° C.) was also passed through the module, after which the apparatus was disassembled and the various components inspected. No change whatsoever was seen in any of the materials.

It is apparent from the above that the deaeration assembly of the invention permits deaeration of a liquid containing a surfactant, and that there is no problem with washing the assembly with 90° C. hot water. Furthermore since the deaeration apparatus used in this example makes use of FEP, PFA, or PTFE for all its liquid-wetted parts, it can also be used with chemically aggressive liquids which are strongly acidic or alkaline.

EXAMPLE 11

A 25 micrometers thick FEP film (made by Daikin Industries) was laminated to a porous PTFE film. The porous PTFE film (made by Japan Gore-Tex, Inc.) was 30 micrometers thick and had a nominal pore size of 0.2 micrometer and pore volume of 85%. The films were thermally fused by application of heat and pressure in passage through the nip of calender rolls at a temperature of about 295° C. to form a laminated composite film.

A 20 mesh (8 mesh/cm) polyester net (0.5 mm thick; 23 cm wide; 8.5 m long) was interposed between the porous PTFE surfaces of the composite film and the edges heat-sealed to form an envelope-type element. An FEP tube, 6 mm OD and 4 mm ID, was connected near one end of the element to serve as a gas-removal tube. The tube was connected and heat-sealed to the element by the method shown in FIG. 5.

A woven mesh of PFA (made by Gunze Co.), about 8 mesh/cm (20 mesh/inch) and 0.51 mm thick, was cut to a width of 23 cm and a length of 8.5 m to serve as a liquid-channel-forming component. The liquid-channel-forming component was placed on and aligned over the element, and the element, with the liquid-channel-forming component interposed between layers, was rolled up (as shown in FIG. 6) to form a spiral-wound deaeration assembly which provided 3.2 $m^2$ of surface area for liquid contact. The deaeration assembly thus made was installed in a module of the type shown in FIG. 8 which had a casing body and end caps made of PTFE. The liquid contact distance was 19 cm, and the gaps between the liquid channels were 0.5 mm.

The module was tested as described in Example 10. The dissolved oxygen concentration at the outlet was 2.45 ppm, 2.62 ppm, and 2.57 ppm at water pressures of 2, 4, and 2 kg/cm$^2$, respectively. The results of the other tests were the same as described in Example 10.

EXAMPLE 12

The composite film prepared as described in Example 11 was stretched an amount of 3:1 in the transverse direction on a heated tenter frame at a temperature of about 285° C. The stretched composite film thickness was 30 micrometers. The thickness of the FEP layer was 9.5 micrometers and the thickness of the PTFE layer was 21 micrometers thick, indicating that the FEP penetrated into the surface region of the porous PTFE film.

A 20 mesh (8 mesh/cm) polyester net (0.5 mm thick; 23 cm wide; 8.5 m long) was interposed between the porous PTFE surfaces of the composite film and the edges heat-sealed to form an envelope-type element. An FEP tube, 6 mm OD and 4 mm ID, was connected near one end of the element to serve as a gas-removal tube. The tube was connected and heat-sealed to the element by the method shown in FIG. 5.

A woven mesh of PFA (made by Gunze Co.), about 8 mesh/cm (20 mesh/inch) and 0.51 mm thick, was cut to a width of 23 cm and a length of 8.5 m to serve as a liquid-channel-forming component. The liquid-channel-forming component was placed on and aligned over the element, and the element, with the liquid-channel-forming component interposed between layers, was rolled up (as shown in FIG. 6) to form a spiral-wound deaeration assembly which provided 3.2 m$^2$ of surface area for liquid contact. The deaeration assembly thus made was installed in a module of the type shown in FIG. 8 which had a casing body and end caps made of PTFE. The liquid contact distance was 19 cm, and the gaps between the liquid channels were 0.5 mm.

The module was tested as described in Example 10. The dissolved oxygen concentration at the outlet was 1.70 ppm, 1.80 ppm, and 1.74 ppm at water pressures of 2, 4, and 2 kg/cm$^2$, respectively. The results of the other tests were the same as described in Example 10. The results are a clear indication of the improved deaeration and sufficiency of strength provided by the thinner fluoropolymer film envelope.

EXAMPLE 13

The surface of a 25 micrometers thick PFA film (made by Daikin Industries) was washed with ethyl alcohol and dried at room temperature. The washed surface of the film was treated with TETRA-ETCH® (an etchant for fluoropolymer surfaces, made by Junkosha Corp.), then washed again with ethyl alcohol and dried. The washed film was laminated to a 250 micrometers thick polyester knit fabric (Stock No. 2020, 20 denier staple fiber, made by Toray Co.) using an epoxy resin-based adhesive (Product. No. 3446, made by Mereko Co.) applied in a dot pattern by a gravure printing roll. The laminated composite film was heated in an oven at 80° C. for 2 hours.

Two sheets of the laminated composite, 19 cm wide and 8.5 m long, were superposed with the PFA film on the outside and the four edges heat sealed to form an envelope-type element. An PFA tube, 6 mm OD and 4 mm ID, was connected near one end of the element to serve as a gas-removal tube. The tube was connected and heat-sealed to the element by the method shown in FIG. 5.

A woven mesh of PFA (made by Gunze Co.), about 8 mesh/cm (20 mesh/inch) and 0.51 mm thick, was cut to a width of 23 cm and a length of 8.5 m to serve as a liquid-channel-forming component. The liquid-channel-forming component was placed on and aligned over the element, and the element, with the liquid-channel-forming component interposed between layers, was rolled up (as shown in FIG. 6) to form a spiral-wound deaeration assembly which provided 3.2 m$^2$ of surface area for liquid contact. The deaeration assembly thus made was installed in a module of the type shown in FIG. 8 which had a casing body and end caps made of PTFE. The liquid contact distance was 19 cm, and the gaps between the liquid channels were 0.5 mm.

The deaeration assembly was tested by flowing tap-water having an initial dissolved oxygen concentration of 8.5 ppm through the module at a rate of 200 cc/minute at 22° C. The pressure inside the element was reduced and kept at about 60 Torr by a vacuum pump. The differential pressure between the water inlet and outlet of the module was 0.1 kg/cm$^2$.

When the module was first operated at water pressure of 2 kg/cm$^2$ the dissolved oxygen concentration of the deaerated liquid at the outlet of the module was measured and found to be 3.31 ppm, which is a good value. When the water pressure was raised to 4 kg/cm$^2$ the dissolved oxygen content at the outlet was 3.35 kg/cm$^2$, and when the water pressure was returned to 2 kg/cm$^2$ the dissolved oxygen concentration was 3.41 ppm, verifying that the envelope film had good strength.

A second test under the same conditions except that tap-water containing 5% neutral detergent (with surfactant) was used. The dissolved oxygen content of the deaerated liquid at the outlet was found to be 3.30 ppm, which is a good value.

After the second test, the module was emptied of water and filled with 98% ethyl alcohol. The pressure inside the element was reduced to 30 Torr. No alcohol was detected in the gas sampled from the gas removal tube, confirming that the alcohol liquid did not permeate through the FEP deaeration film.

Hot water (90° C.) was also passed through the module, after which the apparatus was disassembled and the various components inspected. No change whatsoever was seen in any of the materials.

It is apparent from the above that the deaeration assembly of the invention permits deaeration of a liquid containing a surfactant, and that there is no problem with washing the assembly with 90° C. hot water. Furthermore since the deaeration apparatus used in this example makes use of FEP, PFA, or PTFE for all its liquid-wetted parts, it can also be used with chemically aggressive liquids which are strongly acidic or alkaline.

EXAMPLE 14

A 25 micrometers thick PFA film (made by Daikin Industries) was laminated to a porous PTFE film. The porous PTFE film (made by Japan Gore-Tex, Inc.) was 30 micrometers thick and had a nominal pore size of 0.2 micrometer and pore volume of 85%. The films were thermally fused by application of heat and pressure in passage through the nip of calender rolls at a temperature of about 295° C. to form a laminated composite film.

A 20 mesh (8 mesh/cm) polyester net (0.5 mm thick; 23 cm wide; 8.5 m long) was interposed between the porous PTFE surfaces of the composite film and the edges heat-sealed to form an envelope-type element. An PFA tube, 6 mm OD and 4 mm ID, was connected near one end of the element to serve as a gas-removal tube. The tube was connected and heat-sealed to the element by the method shown in FIG. 5.

A woven mesh of PFA (made by Gunze Co.), about 8 mesh/cm (20 mesh/inch) and 0.51 mm thick, was cut to a width of 23 cm and a length of 8.5 m to serve as a liquid-channel-forming component. The liquid-channel-forming component was placed on and aligned over the element, and the element, with the liquid-channel-forming component interposed between layers, was rolled up (as shown in FIG. 6) to form a spiral-wound deaeration assembly which provided 3.2 m$^2$ of surface area for liquid contact. The deaeration assembly thus made was installed in a module of the type shown in FIG. 8 which had a casing body and end caps made of PTFE. The liquid contact distance was 19 cm, and the gaps between the liquid channels were 0.5 mm.

The module was tested as described in Example 10. The dissolved oxygen concentration at the outlet was 2.65 ppm, 2.84 ppm, and 2.68 ppm at water pressures of 2, 4, and 2 kg/cm$^2$, respectively. The results of the other tests were the same as described in Example 10.

EXAMPLE 15

The composite film prepared as described in Example 14 was stretched an amount of 3:1 in the transverse direction on a heated tenter frame at a temperature of about 285° C. The stretched composite film thickness was 30 micrometers. the thickness of the PFA layer was 9.5 micrometers and the thickness of the PTFE layer was 21 micrometers thick, indicating that the FEP penetrated into the surface region of the porous PTFE film.

A 20 mesh (8 mesh/cm) polyester net (0.5 mm thick; 23 cm wide; 8.5 m long) was interposed between the porous PTFE surfaces of the composite film and the edges heat-sealed to form an envelope-type element. An PFA tube, 6 mm OD and 4 mm ID, was connected near one end of the element to serve as a gas-removal tube. The tube was connected and heat-sealed to the element by the method shown in FIG. 5.

A woven mesh of PFA (made by Gunze Co.), about 8 mesh/cm (20 mesh/inch) and 0.51 mm thick, was cut to a width of 23 cm and a length of 8.5 m to serve as a liquid-channel-forming component. The liquid-channel-forming component was placed on and aligned over the element, and the element, with the liquid-channel-forming component interposed between layers, was rolled up (as shown in FIG. 6) to form a spiral-wound deaeration assembly which provided 3.2 m$^2$ of surface area for liquid contact. The deaeration assembly thus made was installed in a module of the type shown in FIG. 8 which had a casing body and end caps made of PTFE. The liquid contact distance was 19 cm, and the gaps between the liquid channels were 0.5 mm.

The module was tested as described in Example 10. The dissolved oxygen concentration at the outlet was 1.85 ppm, 1.95 ppm, and 1.86 ppm at water pressures of 2, 4, and 2 kg/cm$^2$, respectively. The results of the other tests were the same as described in Example 10. The results are a clear indication of the improved deaeration and sufficiency of strength provided by the thinner fluoropolymer film envelope.

We claim:

1. In an apparatus, a deaeration assembly for removal of a gas from a liquid comprising:

(a) a deaeration element having a gas-channel-forming component enclosed and sealed within, but not bonded to, an envelope formed of a nonporous film of tetrafluoroethylene/(perfluoroalkyl) vinyl ether copolymer (PFA), said envelope having inward-facing and outward-facing surfaces and at least one port leading from the inside to the outside of said envelope for passage of gases permeating into the element to a location external to the apparatus; and (b) a liquid-channel-forming component contiguous with at least one outward-facing surface of said fluoropolymer film envelope, said liquid-channel-forming component providing pathways for a liquid to contact and flow over said outward-facing surface of the envelope.

2. The deaeration assembly for removal of a gas from a liquid as recited in claim 1 wherein said liquid-channel-forming component is formed of a fluoropolymer material.

3. The deaeration assembly for removal of a gas from a liquid as recited in claim 2 wherein said gas-channel-forming component comprises at least one porous material selected from the group consisting of nonwoven fabric, knit fabric, woven fabric or mesh, open-cell foams, and porous membranes, of synthetic polymers, said gas-channel-forming component having continuous interconnected pores and passageways throughout its structure whereby passage of gases is enabled.

4. The deaeration assembly for removal of a gas from a liquid as recited in claim 1 wherein said gas-channel-forming component comprises at least one porous material selected from the group consisting of nonwoven fabric, knit fabric, woven fabric or mesh, open-cell foams, and porous membranes, of synthetic polymers, said gas-channel-forming component having continuous interconnected pores and passageways throughout its structure whereby passage of gases is enabled.

5. In an apparatus, a deaeration assembly for removal of a gas from a liquid comprising:

a deaeration element having a gas-channel-forming component and a liquid-channel-forming component having a contoured surface of higher and lower regions, said components enclosed and sealed within, but not bonded to, an envelope formed of a nonporous film of tetrafluoroethylene/(perfluoroalkyl) vinyl ether copolymer, said envelope having inward-facing and outward-facing surfaces and at least one port leading from the inside to the outside of said envelope for passage of gases permeating into the element to a location external to the apparatus;

wherein said liquid-channel-forming component is contiguous with at least one inward-facing surface of said envelope, and wherein the region of said envelope in contact with said liquid-channel-forming component conforms to the contoured surface of the liquid-channel-forming component to form channels in said outward-facing surface, said channels providing pathways for a liquid to contact and flow over the outward surface of the envelope.

6. The deaeration assembly for removal of a gas from a liquid as recited in claim 5 wherein said gas-channel-forming component and said liquid-channel-forming component comprise at least one porous material selected from the group consisting of nonwoven fabric, knit fabric, woven fabric or mesh, open-cell foams, and porous membranes, of synthetic polymers, said gas-channel-forming component having continuous interconnected pores and passageways throughout its structure whereby passage of gases is enabled.

7. In an apparatus, a deaeration assembly for removal of a gas from a liquid comprising:
(a) a deaeration element having a gas-channel-forming component enclosed and sealed within, but not bonded to, an envelope, said envelope comprising a nonporous fluoropolymer film laminated to a porous polytetrafluoroethylene membrane;
said envelope having porous inward-facing surfaces and nonporous outward-facing surfaces, and at least one port leading from the inside to the outside of said envelope for passage of gases permeating into the element to a location external to the apparatus; and
(b) a liquid-channel-forming component contiguous with at least one outward-facing surface of said fluoropolymer film envelope, said liquid-channel-forming component providing pathways for a liquid to contact and flow over said outward-facing surface of the envelope.

8. The deaeration assembly for removal of a gas from a liquid as recited in claim 7 wherein said nonporous fluoropolymer film is a film of tetrafluoroethylene-hexafluoropropylene copolymer.

9. The deaeration assembly for removal of a gas from a liquid as recited in claim 8 wherein said liquid-channel-forming component is formed of a fluoropolymer material.

10. The deaeration assembly for removal of a gas from a liquid as recited in claim 9 wherein said gas-channel-forming component comprises at least one porous material selected from the group consisting of nonwoven fabric, knit fabric, woven fabric or mesh, open-cell foams, and porous membranes, of synthetic polymers, said gas-channel-forming component having continuous interconnected pores and passageways throughout its structure whereby passage of gases is enabled.

11. The deaeration assembly for removal of a gas from a liquid as recited in claim 8 wherein said gas-channel-forming component comprises at least one porous material selected from the group consisting of nonwoven fabric, knit fabric, woven fabric or mesh, open-cell foams, and porous membranes, of synthetic polymers, said gas-channel-forming component having continuous interconnected pores and passageways throughout its structure whereby passage of gases is enabled.

12. The deaeration assembly for removal of a gas from a liquid as recited in claim 7 wherein said nonporous film is a film of tetrafluoroethylene-(perfluoroalkyl) vinyl ether copolymer.

13. The deaeration assembly for removal of a gas from a liquid as recited in claim 12 wherein said liquid-channel-forming component is formed of a fluoropolymer material.

14. The deaeration assembly for removal of a gas from a liquid as recited in claim 13 wherein said gas-channel-forming component comprises at least one porous material selected from the group consisting of nonwoven fabric, knit fabric, woven fabric or mesh, open-cell foams, and porous membranes, of synthetic polymers, said gas-channel-forming component having continuous interconnected pores and passageways throughout its structure whereby passage of gases is enabled.

15. The deaeration assembly for removal of a gas from a liquid as recited in claim 12 wherein said gas-channel-forming component comprises at least one porous material selected from the group consisting of nonwoven fabric, knit fabric, woven fabric or mesh, open-cell foams, and porous membranes, of synthetic polymers, said gas-channel-forming component having continuous interconnected pores and passageways throughout its structure whereby passage of gases is enabled.

16. The deaeration assembly for removal of a gas from a liquid as recited in claim 7 wherein said gas-channel-forming component comprises at least one porous material selected from the group consisting of nonwoven fabric, knit fabric, woven fabric or mesh, open-cell foams, and porous membranes, of synthetic polymers, said gas-channel-forming component having continuous interconnected pores and passageways throughout its structure whereby passage of gases is enabled.

17. In an apparatus, a deaeration assembly for removal of a gas from a liquid comprising:
a deaeration element having a gas-channel-forming component and a liquid-channel-forming component having a contoured surface of higher and lower regions, said components enclosed and sealed within, but not bonded to, an envelope, said envelope comprising a nonporous fluoropolymer film laminated to a porous polytetrafluoroethylene membrane;
said envelope having porous inward-facing surfaces and nonporous outward-facing surfaces, and at least one port leading from the inside to the outside of said envelope for passage of gases permeating into the element to a location external to the apparatus;
wherein said liquid-channel-forming component is contiguous with at least one inward-facing surface of said fluoropolymer film envelope, and
wherein the region of said fluoropolymer film envelope in contact with said liquid-channel-forming component conforms to the contoured surface of the liquid-channel-forming component to form liquid channels in said outward-facing surface, said channels providing pathways for a liquid to contact and flow over the outward-facing surface of the envelope.

18. The deaeration assembly for removal of a gas from a liquid as recited in claim 17 wherein said nonporous fluoropolymer film is a film of tetrafluoroethylene-hexafluoropropylene copolymer.

19. The deaeration assembly for removal of a gas from a liquid as recited in claim 18 wherein said gas-channel-forming component and said liquid-channel-forming component comprise at least one porous material selected from the group consisting of nonwoven fabric, knit fabric, woven fabric or mesh, open-cell foams, and porous membranes, of synthetic polymers, said gas-channel-forming component having continuous interconnected pores and passageways throughout its structure whereby passage of gases is enabled.

20. The deaeration assembly for removal of a gas from a liquid as recited in claim 17 wherein said nonporous fluoropolymer film is a film of tetrafluoroethylene-(perfluoroalkyl) vinyl ether copolymer.

21. The deaeration assembly for removal of a gas from a liquid as recited in claim 20 wherein said gas-channel-forming component and said liquid-channel-forming component comprise at least one porous material selected from the group consisting of nonwoven fabric, knit fabric, woven fabric or mesh, open-cell foams, and porous membranes, of synthetic polymers, said gas-channel-forming component having continuous interconnected pores and passageways throughout its structure whereby passage of gases is enabled.

22. The deaeration assembly for removal of a gas from a liquid as recited in claim 17 wherein said gas-channelforming component and said liquid-channel-forming component comprise at least one porous material selected from the group consisting of nonwoven fabric, knit fabric, woven fabric or mesh, open-cell foams, and porous membranes, of synthetic polymers, said gas-channel-forming component having continuous interconnected pores and passageways throughout its structure whereby passage of gases is enabled.

* * * * *